United States Patent [19]
Kepner

[11] Patent Number: 6,029,762
[45] Date of Patent: Feb. 29, 2000

[54] BATTERY WARMER FOR EXTENDING THE RANGE OF AN ELECTRICALLY POWERED VEHICLE

[75] Inventor: Kent G. Kepner, Racine, Wis.

[73] Assignee: Textron Inc., Providence, R.I.

[21] Appl. No.: 08/787,474

[22] Filed: Jan. 22, 1997

[51] Int. Cl.[7] .................................................. B60K 1/00
[52] U.S. Cl. ...................... 180/65.1; 180/68.1; 180/68.5
[58] Field of Search ................................. 180/65.1, 68.2, 180/68.3, 68.1, 68.5

[56] References Cited

U.S. PATENT DOCUMENTS

| | | |
|---|---|---|
| 2,057,417 | 10/1936 | Clapper . |
| 2,417,613 | 3/1947 | Radabaugh . |
| 2,597,735 | 5/1952 | Jepson . |
| 3,410,063 | 11/1968 | Speiser . |
| 3,425,197 | 2/1969 | Kita . |
| 3,429,110 | 2/1969 | Strasel . |
| 3,511,033 | 5/1970 | Strasel . |
| 3,511,034 | 5/1970 | Strasel . |
| 3,613,337 | 10/1971 | Akgulian et al. . |
| 3,631,659 | 1/1972 | Horowitz . |
| 3,729,912 | 5/1973 | Weber . |
| 3,732,671 | 5/1973 | Allen et al. . |
| 3,841,069 | 10/1974 | Weck . |
| 3,924,389 | 12/1975 | Kita . |
| 4,021,996 | 5/1977 | Bartlett et al. . |
| 4,024,448 | 5/1977 | Christianson et al. . |
| 4,145,864 | 3/1979 | Brewster, Jr. . |
| 4,306,402 | 12/1981 | Whimp . |
| 4,680,922 | 7/1987 | Arnold . |
| 4,685,280 | 8/1987 | Lloyd et al. . |
| 4,686,445 | 8/1987 | Phillips . |
| 4,718,286 | 1/1988 | Eller . |
| 4,878,338 | 11/1989 | Aldred et al. . |
| 4,947,630 | 8/1990 | Rich et al. . |
| 4,980,539 | 12/1990 | Walton . |
| 4,995,227 | 2/1991 | Foster . |
| 5,007,234 | 4/1991 | Shurman et al. . |
| 5,031,712 | 7/1991 | Karolek et al. ........................ 180/68.2 |
| 5,082,075 | 1/1992 | Karolek et al. ........................ 180/68.2 |
| 5,140,249 | 8/1992 | Linder et al. . |
| 5,172,559 | 12/1992 | Renken et al. ............................. 62/81 |
| 5,204,814 | 4/1993 | Noonan et al. . |
| 5,261,213 | 11/1993 | Humphrey . |
| 5,301,494 | 4/1994 | Peot et al. . |
| 5,320,190 | 6/1994 | Naumann et al. ..................... 180/68.2 |
| 5,406,778 | 4/1995 | Lamb et al. . |
| 5,417,193 | 5/1995 | Fillman et al. . |
| 5,490,572 | 2/1996 | Tajiri et al. ............................ 180/65.1 |
| 5,502,957 | 4/1996 | Robertson . |
| 5,540,037 | 7/1996 | Lamb et al. . |
| 5,552,240 | 9/1996 | Derstine . |
| 5,553,445 | 9/1996 | Lamb et al. . |

FOREIGN PATENT DOCUMENTS

| | | |
|---|---|---|
| B-84961/91 | 10/1994 | Australia . |
| 5-15233 | 1/1993 | Japan . |
| WO 93/1264 | 7/1993 | WIPO . |

OTHER PUBLICATIONS

Toro Brochure entitled "What mower gives greens the kindest cut of al?" dated Feb. 1994.

Jacobsen Brochure for Tri–King™ Triplex Mowers dated 1992.

*Primary Examiner*—Richard M. Camby
*Attorney, Agent, or Firm*—Harness, Dickey & Pierce, P.L.C.

[57] ABSTRACT

A battery warmer for warming the battery set of an electrically powered vehicle is disclosed. A resistive heating battery warmer is provided that increases the temperature around the batteries during down time and during charging. The batteries maintain the warmth generated by the warmer in an insulated battery compartment even during operation at cooler temperatures. Also, during operation, warmth is restored to the battery compartment by ducting from the electric motors or by using a generator to drive a small engine to power heating coils to maintain the battery temperature.

4 Claims, 2 Drawing Sheets

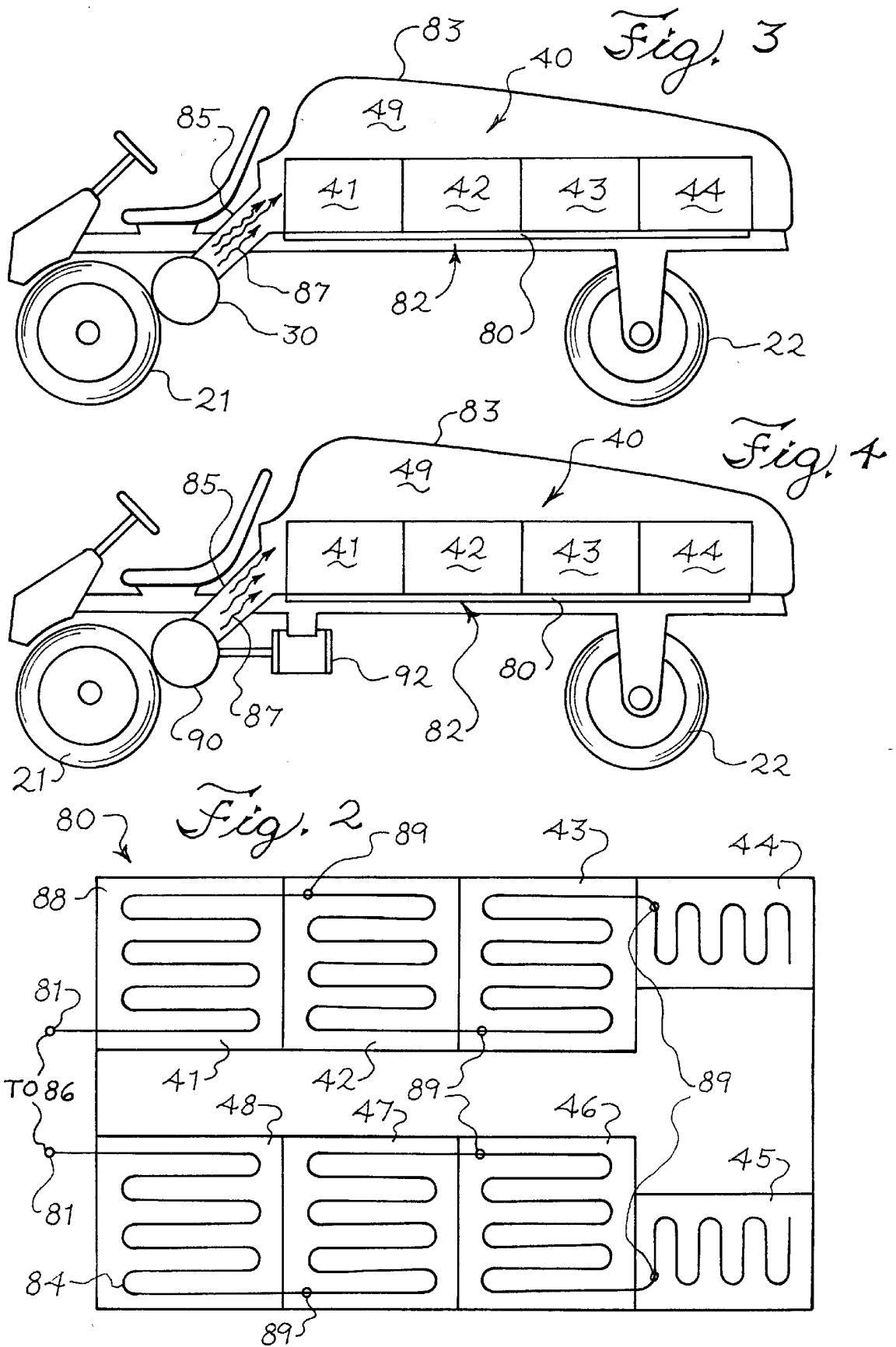

BATTERY WARMER FOR EXTENDING THE RANGE OF AN ELECTRICALLY POWERED VEHICLE

BACKGROUND OF THE INVENTION

1. Field of the Invention

This invention relates in general to an apparatus for extending the range of batteries used in electrically powered vehicles, and in particular to a battery warmer for extending the range of battery life in electric mowers.

2. Prior Art

Golf course greens maintenance equipment have traditionally utilized internal combustion engines. A number of mowers are known in the art. Some are discussed in U.S. Pat. Nos. 3,429,110 and 4,021,996. Mowers with multiple or gang cutting units are the subject of U.S. Pat. Nos. 3,511,033, 3,668,844, 4,866,917 and 5,042,236. All of the mowers discussed in these patents, however, rely on internal combustion engines for power. These internal combustion engines run the risk that fuel or hydraulic fluid will leak from the vehicle and damage the grass.

Furthermore, the use of internal combustion engines has resulted in the inconvenience and the hazard of obtaining and storing the necessary fuel, as well as the inconvenience of servicing the engine. Finally, internal combustion engines create both noise and air pollution.

Taking into consideration the risks and concerns associated with internal combustion engines, battery-powered mowers are a viable option to conventional internal combustion powered mowers. Electric mowers are quiet in operation, do not produce polluting emissions, and eliminate the possibility of spilling fuel or hydraulic fluid onto the greens.

The current electric mowers on the market, however, are at a distinct disadvantage relative to their internal combustion counterparts: the area the electrically powered mowers can mow without returning to be recharged is limited by the range of the battery set. An electric vehicle's range, i.e., the amount of available current from its batteries is affected by the temperature of the batteries. The cooler the batteries, the shorter the range associated with the batteries. Greens mowers usually are stored in areas that can cool to temperatures lower than is most effective for batteries. If the batteries in the electric mower are maintained at a temperature below about 70°+/−5° Fahrenheit, the battery range decreases.

The electric powered mowers currently in the marketplace utilize eight 6-volt lead-acid deep cycle batteries. Lead acid batteries accumulate the most charge, and therefore, can operate over the greatest range when they are charged in an ambient temperature between about 70° and 85° Fahrenheit. Once the battery set has discharged, if more mowing is required, the operator must either re-charge the battery set, which can take around eight to twelve hours, or replace the discharged battery set with a charged, alternate battery set. Generally, the batteries in the battery set are anchored to the mower frame and held in place with a metal hold-down bracket. To remove the batteries, the hold-down must be removed, and the wiring from each battery must be removed. This process is time consuming and not conducive to efficiently mowing an entire golf course.

Accordingly, a need in the art arises for electric mowers that have longer battery ranges, i.e., mowers that can mow more greens without having to return to be recharged.

SUMMARY OF THE INVENTION

A battery warmer has been developed for an electrically powered mower. This battery warmer increases the efficiency when charging the battery, and increases the range of the mower when operating on large areas such as golf courses.

The present invention provides a resistive heating battery warmer that increases the temperature around the batteries both while the mower is not active and while the mower is charging. An insulated battery compartment maintains the warmth generated by the warmer even during operation at cooler temperatures.

Warmth is maintained in the battery compartment by ducting from the electric motors of the mower or by using a small engine driven by a generator to power heat coils 84 or even by using the engine itself to provide heat to the battery compartment to maintain the battery temperature.

One object of the current invention, therefore, is to provide a controlled, beneficial temperature for the batteries in the electric vehicle during down time and during charging.

Another object of the present invention is to maintain the warmth in the insulated battery compartment during operation.

Another object of the present invention is to restore heat to the battery compartment during operation.

A further object of the present invention is to increase the battery range of the electric mower so that more area can be mowed without needing to recharge the battery set.

These and other objects, features, and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 2 is an overhead view of one layout of the resistive heat coils 84 located underneath the batteries;

FIG. 3 is a diagramatic side view of the battery set of the electric mower showing its connection via an air duct to the mower motor; and FIG. 4 is a diagramatic side view of the battery set of the electric mower showing its connection via an air duct to a small electric motor and optional generator.

DETAILED DESCRIPTION OF THE PREFERRED EMBODIMENTS

Figure 1:
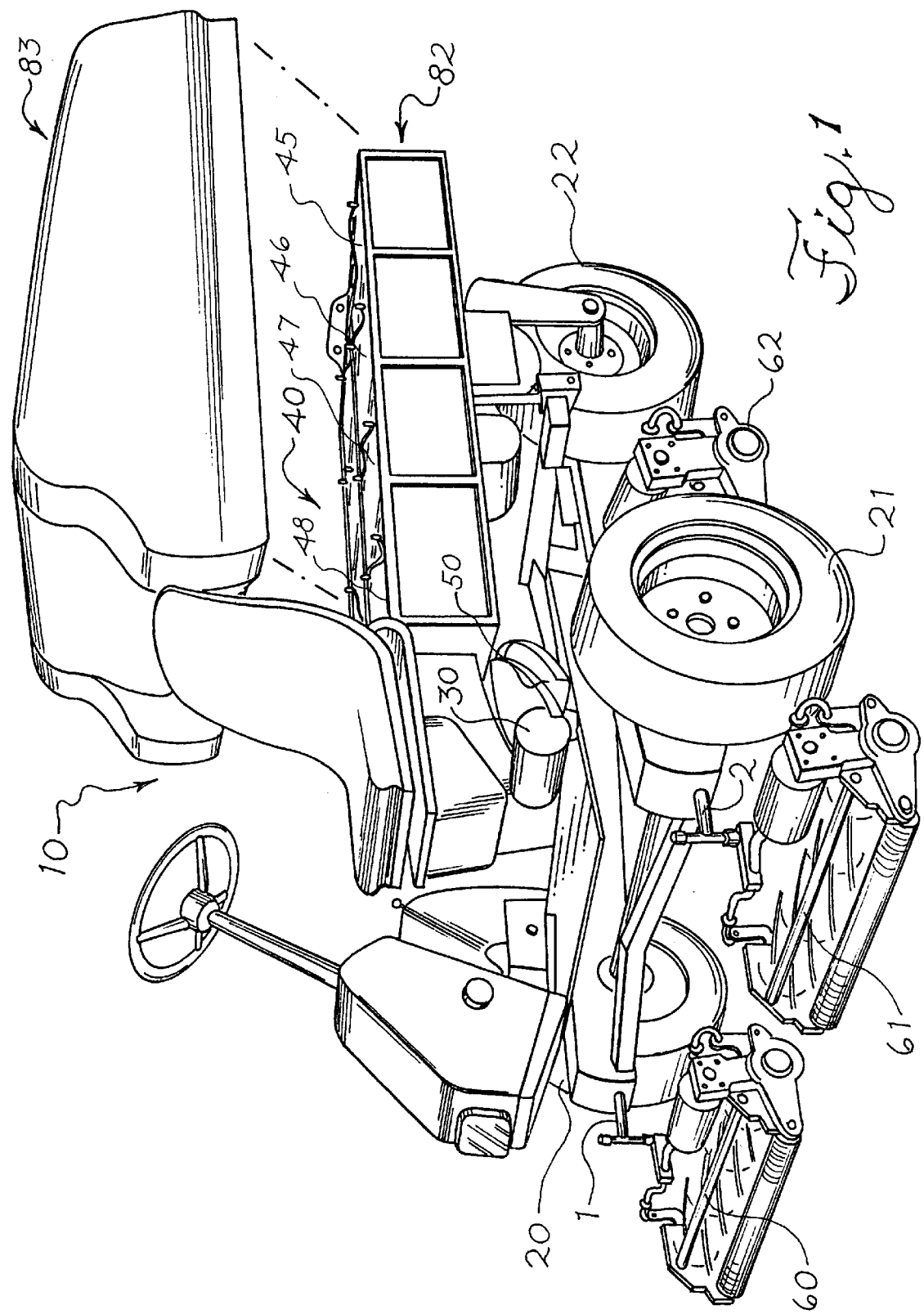
FIG. 1 is a general drawing of the electric mower.

In the Figures, a battery warmer 80 is provided to warm the battery set 40, in order to extend the range of an electric mower 10 shown in FIG. 1.

Although many variations on the construction of the electric vehicle and the accompanying battery warmer are possible, for purposes of illustration, the mower 10 includes three wheels 20, 21, and 22. Two front drive wheels 20 and 21 are powered by an electric drive motor 30. The rear wheel 22 is positioned behind and between the two front drive wheels 20 and 21 and is pivotable to steer the mower 10. Of course numbers other than three wheels can also be used, and a different combination of drive and steering wheels could also be used while still remaining within the scope of the present invention. The cutting units 60, 61, and 62 are positioned ahead of each of the wheels 20, 21, and 22 respectively. The cutting units shown in the Figures are reel cutting units, but they optionally may be rotary cutting units, or other types of cutting units. The cutting units 60, 61, and 62 are mounted on lifts 1, 2, and 3. Electric linear actuators may be used to raise and to lower the lifts, although other means are possible such as hydraulics, pulleys, or gears. When the cutting units 60, 61, and 62 are in the lowered, operative position, the lifts 1, 2, and 3 allow free vertical motion of the cutting units 60, 61, and 62 producing an even cut over an undulating surface such as a golf course green. A controller 50 controls the operations of the electric mower 10.

FIG. 2 is an overhead view of one layout of the resistive heating coils 84 of the battery warmer 80 that preferably are located underneath the battery set 40. Although other types of heating mechanisms can be used without departing from the scope of the present invention, the resistive heating coils 84 are disclosed. In the preferred embodiment, the battery set 40 houses batteries 41–48 (FIG. 3), four on each side of the set. These batteries are preferably 6-volt lead-acid deep cycle batteries, but can be almost any type of battery such as: Nickel-metal hydride, Nickel-cadmium, Nickel-zinc, Zinc/air, Zinc/bromine, etc.

The battery set 40 is located in a substantially closed battery compartment 49 of the mower 10. The coils 84 of the preferred embodiment are positioned beneath each battery 41–48 in a "zigzag" manner or in any other pattern that substantially covers the area under the battery set 40. Each set of horizontally placed coils 84 is positioned in a battery warmer compartment 88 underneath a single battery in the battery set 40, and the coils 84 are electrically coupled to each other between each battery 41–48 at connectors 89. The coils 84 on each side of the battery set 40 have two connectors 81 for connecting to the battery charger 86 (not shown). The temperature of the battery compartment 49 is regulated by a thermostat (not shown) which disconnects power to the battery warmer 80 when the temperature is between a specified range, around 70° to 85° Fahrenheit.

When the battery set 40 is charging, the battery warmer 80 is operational to keep the battery set 40 warm so it can achieve more efficient charge. After charging is completed, but before the operator powers the mower 10 for operation, the battery warmer 80 remains connected to power and keeps the battery set 40 warm so the accumulated charge does not diminish prior to operation of the vehicle 10.

For the most efficient battery charge, the thermostat operating in combination with the battery warmer 80 should keep the battery compartment 49 at a temperature between around 70° Fahrenheit and 85° Fahrenheit. Without the battery warmer system presently disclosed, as the temperature decreases below around 70° Fahrenheit, the available charge on the battery set 40 diminishes as well. In a cold environment, therefore, the effect of the battery warmer 80 will be greater. As the temperature decreases from around 70° Fahrenheit to around 35° Fahrenheit or colder, the charging capability of the battery set 40 due to the battery warmer 80 will increase by ⅓ to ⅔'s of the maximum charging capacity.

The present invention also provides for continued heating of the battery set 40 during operation of the mower 10, which also increases the range through which a charged battery set 40 will operate. FIG. 3 shows a side view of the battery set 40 as it is arranged underneath the hood 83 of the mower 10.

In one preferred embodiment, battery tray 82 lies underneath the battery set 40. The battery tray 82 includes the battery warmer 80 as described with respect to FIG. 2. During operation of the mower 10, the battery warmer 80 receives power from the drive motor 30 and keeps the battery set 40 at an ambient temperature ranging from around 70° to 85° Fahrenheit.

Beneficial results during operation also can be obtained by the embodiment shown in FIG. 3 even if the battery warmer 80 is not functional (or not present) during mower 10 operation. In FIG. 3, both the battery set 40 and the battery tray 82 are positioned inside a substantially closed battery compartment 49 located underneath the hood 83 of the mower 10. An air duct 85 communicates with the battery compartment 49. The other end of the air duct 85 is positioned in the immediate vicinity of the electric drive motor 30. When the electric drive motor 30 powers the drive wheels 20 and 21, heat 87 is generated around the motor 30. The air duct 85 captures the heat 87, which then is directed through the air duct 85 into the battery compartment 49. Forcing the heat 87 from the electric drive motor 30 into the enclosed battery compartment 49 keeps the temperature in the battery compartment 49 higher than it would normally be. The heat 87 is used either to warm the battery set 40 or to keep the battery set 40 warm. The higher temperature increases the range of the battery set 40 while the mower 10 is operating so that more area can be mowed without needing to recharge the battery set 40.

FIG. 4 also shows the air duct 85 communicating with the battery compartment 49. The other end of the air duct 85, however, is operably connected with a small separate motor 90. In the preferred embodiment, this separate motor 90 is powered by electricity, but those skilled in the art will recognize that the separate motor 90 can be powered by any known means, e.g., internal combustion, and still be in accordance with the spirit of the present invention. In one embodiment, the separate motor 90 generates thermal energy or heat 87 which travels up the air duct 85 and into the battery compartment 49. In another embodiment, the separate motor 90 powers the resistive coils 84 of the battery warmer 80 so that the coils 84 can provide heat to the battery set 40.

The separate motor 90 operates on power from a generator 92. The generator 92 powers the motor 90 so that the battery compartment 49 can be maintain at an ambient temperature for the battery set 40 during operation of the electric mower 10, during charging of the battery set 40, and during down time of the electric mower 10. The generator 92 and separate motor 90 combination is operational using either the air duct 85 or the resistive heating coils 84 to warm the battery set 40.

In the foregoing specification, the invention has been described with reference to specific embodiments thereof. It will, however, be evident that various modifications and changes may be made thereto without departing from the broader spirit and scope of the invention as set forth in the appended claims.

For example, the heat gathering function of the air duct 85 can be combined with the heat generating function of the coils 84. In this embodiment, power to the coils 84 is provided by the mower motor 30 as described above, and at the same time, heat 87 is captured by the air duct 85 from around the motor 30 in the manner described above and ducted into the battery compartment 49. A thermostat senses when the temperature inside the battery compartment 49 drops below around 70° Fahrenheit and turns on power from the motor 30 to the battery warmer 80 to provide even further heat for the battery set 40. This embodiment allows for the advantages of both the heat gathering embodiment and the heat generating embodiment. Heat is provided from the mower motor 30 during operation; and further heat if necessary is provided by the coils 84. During charging and down time, the above-described embodiment functions in the same manner as the embodiment disclosed with respect to FIG. 2.

The specification and drawings are, accordingly, to be regarded in an illustrative rather than a restrictive manner.

I claim:

1. An apparatus for improving the range of an electrically powered vehicle comprising:

an electric drive motor;

a battery operatively connected to the electric drive motor;

a substantially enclosed compartment for housing the battery;

a duct operatively connected between the electric drive motor and the substantially enclosed compartment, the duct to provide a path for heat generated by the electric drive motor during operation of the electrically powered vehicle to travel into the substantially enclosed compartment.

2. A method for improving the range of an electrically powered vehicle, said vehicle comprising an electric drive motor, the method comprising the steps of:

enclosing substantially a compartment containing at least one battery;

connecting said at least one battery to said electric drive motor;

providing a duct operatively connected between said electric drive motor and said compartment;

providing heat generated by said electric drive motor into the compartment through said duct; and monitoring temperature in the compartment.

3. The method of claim 2 further comprising the step of maintaining the temperature in the compartment around 70° to 85° Fahrenheit.

4. The method of claim 3 further comprising the step of discontinuing providing heat from the motor into the compartment when the temperature rises above 85° Fahrenheit.

* * * * *